United States Patent
Zhao

(10) Patent No.: US 10,642,514 B2
(45) Date of Patent: May 5, 2020

(54) DEVICE AND METHOD FOR CONFIGURING EXPANDER CONFIGURATION FILE OF A STORAGE SYSTEM

(71) Applicants: INVENTEC (PUDONG) TECHNOLOGY CORPORATION, Shanghai (CN); INVENTEC CORPORATION, Taipei (TW)

(72) Inventor: Wei-Guo Zhao, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 16/061,312

(22) PCT Filed: Mar. 2, 2016

(86) PCT No.: PCT/CN2016/075316
§ 371 (c)(1),
(2) Date: Jun. 11, 2018

(87) PCT Pub. No.: WO2017/096715
PCT Pub. Date: Jun. 15, 2017

(65) Prior Publication Data
US 2018/0357003 A1 Dec. 13, 2018

(30) Foreign Application Priority Data
Dec. 11, 2015 (CN) .......................... 2015 1 0923157

(51) Int. Cl.
G06F 3/06 (2006.01)
H04L 12/931 (2013.01)
G06F 13/40 (2006.01)

(52) U.S. Cl.
CPC .......... *G06F 3/0629* (2013.01); *G06F 3/0607* (2013.01); *G06F 3/067* (2013.01);
(Continued)

(58) Field of Classification Search
CPC ........ G06F 3/0604–0607; G06F 3/0629–0637; G06F 13/4022; G06F 2213/0028; H04L 29/08549; H04L 49/356–358
See application file for complete search history.

(56) References Cited

U.S. PATENT DOCUMENTS

2008/0270631 A1 10/2008 Thomas et al.
2011/0191637 A1 8/2011 Wight et al.
(Continued)

FOREIGN PATENT DOCUMENTS

| CN | 103164168 A | 6/2013 |
|----|----|----|
| CN | 103793180 A | 5/2014 |
| TW | 201508487 A | 3/2015 |

*Primary Examiner* — Nathan Sadler
(74) *Attorney, Agent, or Firm* — Maschoff Brennan

(57) ABSTRACT

The configuring device and method of expander configuration file of a storage system of present invention are to store a configuration file template for configuring the expanders, and to modify the configuration file template to the adapted configuration file corresponding to each expander when configuring the plurality of expander configuration files. The technical solution of the present invention can satisfy the requirement of configuring configuration file to each expander by storing configuration file template only, saving the storage space greatly, and can automatically proceed the modification according to an innovative algorithm without under the risk of error updating.

4 Claims, 3 Drawing Sheets

(52) U.S. Cl.
CPC .......... *G06F 3/0632* (2013.01); *G06F 3/0683* (2013.01); *G06F 3/0689* (2013.01); *G06F 13/4022* (2013.01); *H04L 49/356* (2013.01); *G06F 2213/0028* (2013.01)

(56) References Cited

U.S. PATENT DOCUMENTS

| | | | |
|---|---|---|---|
| 2012/0331181 A1* | 12/2012 | Govande | G06F 8/65 710/8 |
| 2013/0159558 A1* | 6/2013 | Wu | G06F 3/0601 710/9 |
| 2013/0159606 A1* | 6/2013 | Wu | G06F 3/0605 711/103 |
| 2014/0143447 A1* | 5/2014 | Wu | G06F 3/0685 710/3 |
| 2014/0143472 A1* | 5/2014 | More | G06F 13/4081 710/316 |
| 2014/0281219 A1* | 9/2014 | Mendiola | G06F 3/0689 711/114 |
| 2015/0067192 A1* | 3/2015 | Wu | G06F 3/0638 710/4 |

* cited by examiner

DEVICE AND METHOD FOR CONFIGURING EXPANDER CONFIGURATION FILE OF A STORAGE SYSTEM

TECHNICAL FIELD

The present invention relates to a field of storage technology, more particularly to a configuring device for expander configuration file of a storage system and method thereof.

BACKGROUND

Nowadays, storage technologies are rapidly developing, and various new storage technologies come up one after another incessantly. For example, SAS (Serial Attached SCSI) is a new generation of SCSI technology. Like the currently popular Serial ATA (SATA) hard disk, both SAS and SATA adopt serial technology to achieve higher transmission rate and improve internal space by shortening the connection cables. SAS is a new interface developed after the parallel SCSI interface. This interface is designed for improving the performance, availability, and scalability of storage systems and providing compatibility with SATA hard disks.

The SAS expander can be viewed as a switch with SAS interface and can be used in order to expand the capacity in the system of the SAS storage system. More than a dozen of SAS array cards can be linked by the expander, and even hundreds of hard disks can be connected after cascading up expanders.

Each expander chip needs to be configured through a configuration file. As the number of expanders increases, the current situation is that even configurations of expander chips are similar and most configuration contents are similar, however, it is still necessary to store each configuration file corresponding to each expander chip in advance, so that the flash memory in the storage system is out of space. Additionally, each expander chip is required to modify or update different configuration files to the specified area when the expander chips are burned or updated, and there is a risk of error updating or error modification.

SUMMARY

In view of the drawbacks in above statement of the current technology, the purpose of the present invention is to provide a configuring device for expander configuration file of a storage system and method thereof for solving problems existing in the current technology.

For achieving the above purpose and other relevant purposes, the present invention proposes a configuring device for expander configuration file of a storage system characterized in that a plurality of expanders are adapted for being configured by a plurality of corresponding configuration files; and the configuring device comprises: a storage module electrically connected to the plurality of expanders and adapted to store a configuration file template for configuring the expanders; and a configuration file generating module for respectively modifying the configuration file template to the adapted configuration file corresponding to each expander when configuring the plurality of expander configuration files.

In an embodiment of the present invention, the configuration file generating module comprises: an index module adapted to construct a multi-digit number with each provided register value as a digit, and adapted to adopt different values of the multi-digit number as the index value of each expander; a product ID calculating module adapted for calculating and generating a private product ID mark value of the corresponding expander according to a default product ID calculation rule and each index value, and using the private product ID mark value as a default product ID mark character to generate a private product ID; a hard disk slot numbering module adapted for calculating and generating a slot number of a storage system slot corresponding to the expander according to a default hard disk slot calculation rule and each index value; and a modification module adapted for modifying the private product ID and the slot number corresponding to each expander to the configuration file template to generate an adapted configuration file.

In an embodiment of the present invention, said calculating and generating a private product ID mark value of the corresponding expander according to a default product ID calculation rule and each index value comprises: setting a last bit value of a hexadecimal result generated by adding the index value and a hexadecimal number having a last bit value of F as the private product ID mark value.

In an embodiment of the present invention, calculating and generating a slot number of a storage system slot corresponding to the expander according to a default hard disk slot calculation rule and each index value by the hard disk slot numbering module comprises: calculating an offset according to each index value and generating the hard disk slot number by adding the offset and a default value.

In an embodiment of the present invention, the plurality of expanders are applied in a fiber storage card or a disk array card.

For achieving the above purpose and other relevant purposes, the present invention proposes a configuration method of expander configuration file of a storage system characterized in that a plurality of expanders are adapted for being configured by a plurality of corresponding configuration files; said method comprises: storing a configuration file template for configuring the expanders; and modifying the configuration file template to the adapted configuration file corresponding to each expander when configuring the plurality of expander configuration files.

In an embodiment of the present invention, said modifying the configuration file template to the adapted configuration file corresponding to each expander when configuring the plurality of expander configuration files comprises: providing a register variable and adopting different values of the register variable as an index value of each expander; calculating and generating a private product ID mark value of the corresponding expander according to a default product ID calculation rule and each index value and using the private product ID mark value as a default product ID mark character to generate a private product ID; calculating and generating a slot number of a storage system slot corresponding to the expander according to a default hard disk slot calculation rule and each index value; and modifying the private product ID and the slot number corresponding to each expander to the configuration file template to generate an adapted configuration file.

In an embodiment of the present invention, said calculating and generating a private product ID mark value of the corresponding expander according to a default product ID calculation rule and each index value comprises: setting a last bit value of a hexadecimal result generated by adding the index value and a hexadecimal number having a last bit value of F as the private product ID mark value.

In an embodiment of the present invention, said calculating and generating a slot number of a storage system slot corresponding to the expander according to a default hard disk slot calculation rule and each index value comprises: calculating an offset according to each index value and generating the hard disk slot number by adding the offset and a default value.

In an embodiment of the present invention, the plurality of expanders are applied in a fiber storage card or a disk array card.

For achieving the above purpose and other relevant purposes, the present invention proposes a storage system comprising a plurality of expanders and the configuring device for configuring corresponding configuration files for the plurality of expanders.

As described above, the configuring device and method of expander configuration file of a storage system of present invention are to store a configuration file template for configuring the expanders; and to modify the configuration file template to the adapted configuration file corresponding to each expander when configuring the plurality of expander configuration files. The technical solution of the present invention can satisfy the requirement of configuring configuration file to each expander by storing configuration file template only, saving the storage space greatly, and can automatically proceed the modification according to an innovative algorithm without under the risk of error updating.

Figure 1:
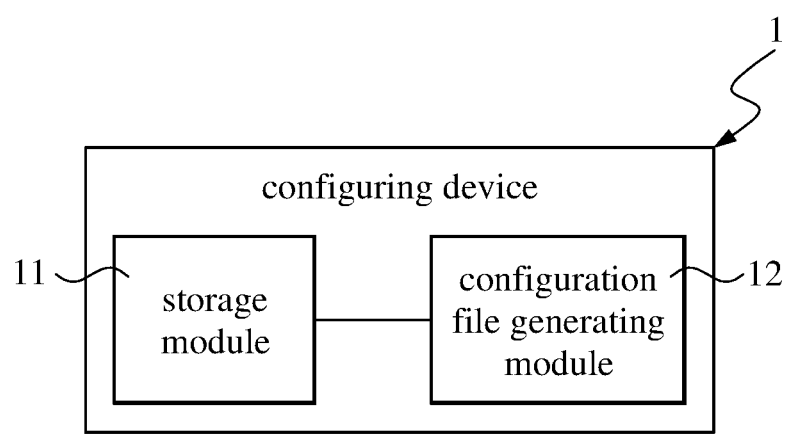
FIG. 1 illustrates a structure schematic of the configuring device according to an embodiment of the present invention.

SYMBOL DESCRIPTION 1 configuring device
11 storage module
12 configuration file generating module
121 index module
122 product ID calculating module
123 hard disk slot numbering module
124 modification module

DETAILED DESCRIPTIONS

The embodiments of the present invention are described below through specific examples. Those skilled in the art can easily understand other advantages and effects of the present invention from the contents disclosed in this specification. The present invention can also be implemented or applied through different specific implementation manners. The details of this specification may also be based on different perspectives and applications, and various modifications or changes may be made without departing from the spirit of the present invention. It is noted that the technical features in the following embodiments and examples are allowed to be combined with each other as long as conflicts do not occur between them.

In addition, it is particularly noted that the drawings provided in the following embodiments merely illustrate the basic concept of the present invention in a schematic manner, so that the drawings only show the components related to the present invention and do not show the number of components, shapes and sizes in actual implementation. In fact, in an actual implementation, types, quantities and proportions of components can be modified arbitrarily, and the layout of the components may also be more complicated.

The application environment of the technical solution of the present invention is a storage system, said storage system is, for example, SAS storage system, and the present invention is to configure the configuration file to the expander chip in the expander of the storage system.

As shown in FIG. 1, the present invention proposes a configuring device 1 of expander configuration file of a storage system, wherein a plurality of expanders (2~n) are configured by a plurality of corresponding configuration files.

The configuring device 1 comprises a storage module 11 and a configuration file generating module 12.

The storage module 11 electrically connects to the plurality of expanders and is adapted to store a configuration file template for configuring the expanders.

The configuration file generating module 12 is adapted to respectively modify the configuration file template to the adapted configuration file corresponding to each expander when configuring the plurality of expander configuration files.

In an embodiment of the present invention, the main difference between each expander configuration files is that the respective assigned product IDs and respective slot numbers of connected hard disk slots are different, therefore the product ID and the slot number of any expander can be calculated by a predefined function algorithm. Preferably, the pre-distributed register value corresponding to each expander can be used as a calculation basis.

Figure 2:
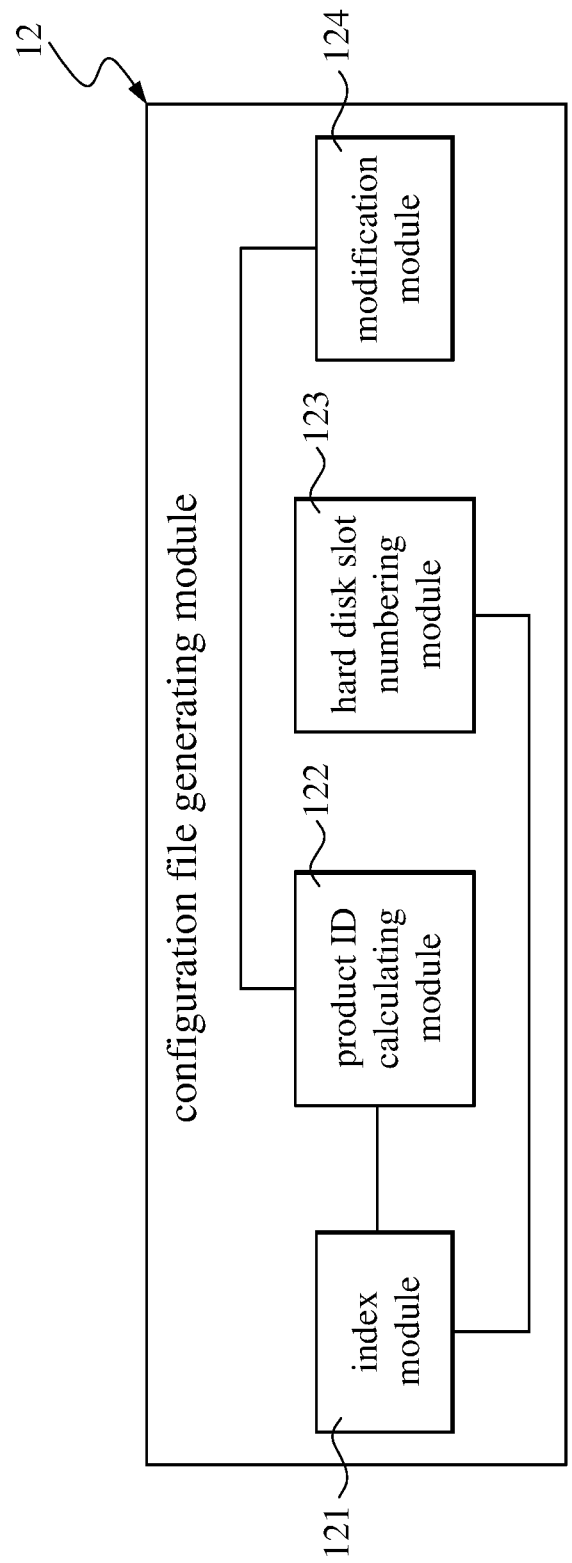
FIG. 2 illustrates a structure schematic of the configuration file generating module in the configuring device according to an embodiment of the present invention.

An embodiment is provided in the following for the detail description, as shown in FIG. 2, the configuration file generation module 12 comprises: an index module 121, a product ID calculating module 122, a hard disk slot numbering module 123 and a modification module 124.

The index module 121 is adapted to construct a multi-digit number with each provided register value as a digit, and adapted to adopt different values of the multi-digit number as the index value of each expander.

In an embodiment of the present invention, one can declare a GPIO register variable having multiple digits to store the expander's index (GPIOIN) represented by GPIO.

The register variable is a binary value, a 3-digit binary number can represent $8(2^3)$ values according to the binary algorithm. If the value of 000 is not used, index values of 001-111 corresponding to 7 expanders can be generated. For example. as shown in following Table 1, the GPIO values in the following table correspond to the above values of the GPIOIN variable.

TABLE 1

| Expander | GPIO 7 | GPIO 6 | GPIO 5 |
| --- | --- | --- | --- |
| Expander 0 | 0 | 0 | 1 |
| Expander 1 | 0 | 1 | 0 |
| Expander 2 | 0 | 1 | 1 |
| Expander 3 | 1 | 0 | 0 |
| Expander 4 | 1 | 0 | 1 |
| Expander 5 | 1 | 1 | 0 |
| Expander 6 | 1 | 1 | 1 |

The product ID calculating module 122 is adapted for calculating and generating a private product ID mark value of the corresponding expander according to a default product ID calculation rule and each index value, and using the private product ID mark value as a default product ID mark character to generate a private product ID;

In an embodiment of the present invention, take a specific example to explain how to calculate product ID: one can use the function of product ID calculation to call the above GPIO value for calculation.

Calculating and generating a private product ID mark value of the corresponding expander according to a default product ID calculation rule and each index value comprises: setting a last bit value of a hexadecimal result generated by adding the index value and a hexadecimal number having a last bit value of F as the private product ID mark value.

Mark value=GPIO7*4+GPIO6*2+GPIO5*1+0xYF, where Y can be customized, and the result of 0~7 can be calculated. In other embodiment, a larger mark value can be calculated.

Moreover, a variable one may be introduced to represent values of 000-111 of GPIO7, GPIO6 and GPIO5.

Because the number of product ID is less, this mark value is smaller. As a result, a system minimum unit 8 bit can be chosen to represent this mark value, and the maximum number of the mark value is the 8th power of 2 (256). The system maximum unit can be 32 bit, that is, the $32^{nd}$ power of 2.

When the default product ID is "CiB-U90v3-E0", the mark value is converted into the mark character such as "0-7" as its last one bit or more bits, then it can calculate and generate the product ID corresponding to the expander according to the index value as shown in following Table 2:

TABLE 2

| Expander | GPIO 7 | GPIO 6 | GPIO 5 | Product ID |
|---|---|---|---|---|
| Expander 0 | 0 | 0 | 1 | CiB-U90v3-E0 |
| Expander 1 | 0 | 1 | 0 | CiB-U90v3-E1 |
| Expander 2 | 0 | 1 | 1 | CiB-U90v3-E2 |
| Expander 3 | 1 | 0 | 0 | CiB-U90v3-E3 |
| Expander 4 | 1 | 0 | 1 | CiB-U90v3-E4 |
| Expander 5 | 1 | 1 | 0 | CiB-U90v3-E5 |
| Expander 6 | 1 | 1 | 1 | CiB-U90v3-E6 |

The hard disk slot numbering module 123 is adapted for calculating and generating a slot number of a storage system slot corresponding to the expander according to a default hard disk slot calculation rule and each index value.

In an embodiment of the present invention, if each expander has 10 hard disk slots, then there are corresponding 10 hard disk slot numbers, the following Table 3 shows the result after numbering each slot:

| Expander | GPIO 7 | GPIO 6 | GPIO 5 | Hard disk slot number |
|---|---|---|---|---|
| Expander 0 | 0 | 0 | 1 | Slot 0~9 |
| Expander 1 | 0 | 1 | 0 | Slot 10~19 |
| Expander 2 | 0 | 1 | 1 | Slot 20~29 |
| Expander 3 | 1 | 0 | 0 | Slot 30~39 |
| Expander 4 | 1 | 0 | 1 | Slot 40~49 |
| Expander 5 | 1 | 1 | 0 | Slot 50~59 |
| Expander 6 | 1 | 1 | 1 | Slot 60~69 |
| Expander 0 | 0 | 0 | 1 | Slot 0~9 |
| Expander 1 | 0 | 1 | 0 | Slot 10~19 |
| Expander 2 | 0 | 1 | 1 | Slot 20~29 |
| Expander 3 | 1 | 0 | 0 | Slot 30~39 |

-continued

| Expander | GPIO 7 | GPIO 6 | GPIO 5 | Hard disk slot number |
|---|---|---|---|---|
| Expander 4 | 1 | 0 | 1 | Slot 40~49 |
| Expander 5 | 1 | 1 | 0 | Slot 50~59 |
| Expander 6 | 1 | 1 | 1 | Slot 60~69 |

From Table 3, it can be found that the corresponding hard disk slot number can be calculated by calculating the offset with a predetermined algorithm then adding the offset and the default value according to the index value as a calculation basis.

The following is a specific implementation of the example:

slotOffset=(GPIO7*4+GPIO6*2+GPIO5*1−1)*10. For example, the offset of Expander 0 is 0. In combination with the original algorithm for calculating the slot number, it can obtain slot number: 0-9 by adding the default values 0-9 of 10 connected hard disks and offset 0. Take another example, the offset of Expander 1 is 10, the slot number 10-19 can be obtained by adding the offset of Expander 1 and the default value of 0-9, and so on. Finally, each slot number shown in Table 3 can be obtained. The determination of the default value can adopt the method of traversing and the connected hard disk slots and defining in order. Of course, other methods may also be used but are not enumerated here.

Preferably, regarding the application objects of expanders are different, for example, fiber storage card (HBA card) and disk array card (MegaRAID card), although the principles of calculating slot number are similar, the respective lengths of existing control programs are different, thus the position of the algorithm program that calculates the slot number offset in the respective control program can be different.

For example, the original configuration code of HBA is longer, so the offset is extracted and calculated beforehand then adding it to the following code; while the RAID code is relatively short, so the calculation of the offset can be directly added into the original code.

The modification module 124 is adapted for modifying the private product ID and the slot number corresponding to each expander to the configuration file template to generate an adapted configuration file. One can obtain the configuration file corresponding to the expander and proceed the configuration according to only one configuration file template with the product ID and slot number calculated by the above calculation function are modified into the configuration template.

In an embodiment of the present invention, the function of the configuration file generating module 12 can be implemented by the controller loading program of the storage system and said controller comprises processor chip (CPU, MCU, and SoC, etc)

In a combination of the above description, the present invention can further propose a storage system comprising a plurality of said expanders adapted to be configured with corresponding configuration files and said configuring device adapted to configure corresponding configuration file for each expander, The configuring device has the same function as the configuring device, which will not be repeated here. Of course, the storage system can further comprise various storage media such as a hard disk.

Referring to the embodiment of the device shown in FIG. 1 and FIG. 2, the present invention can further propose the embodiment of the method. Because of the principle is basically the same, the same technical features will not be repeated.

Figure 3:
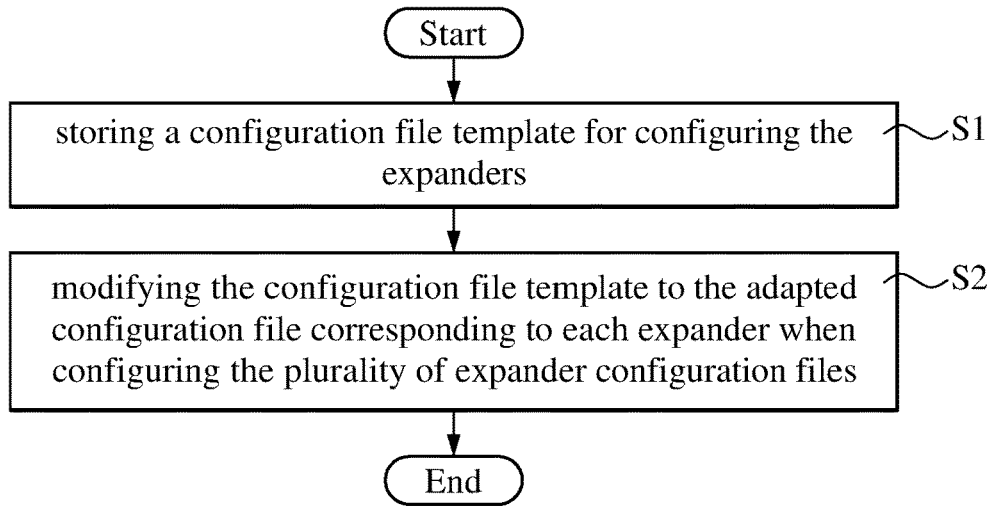
FIG. 3 illustrates a flowchart of the configuring method according to an embodiment of the present invention.

As shown in FIG. 3, the present invention provides a configuration method of expander configuration file of a storage system, a plurality of expanders are adapted for being configured by a plurality of corresponding configuration files, and said method comprises:

Step S1: storing a configuration file template for configuring the expanders;

Step S2: modifying the configuration file template to the adapted configuration file corresponding to each expander when configuring the plurality of expander configuration files.

Figure 4:
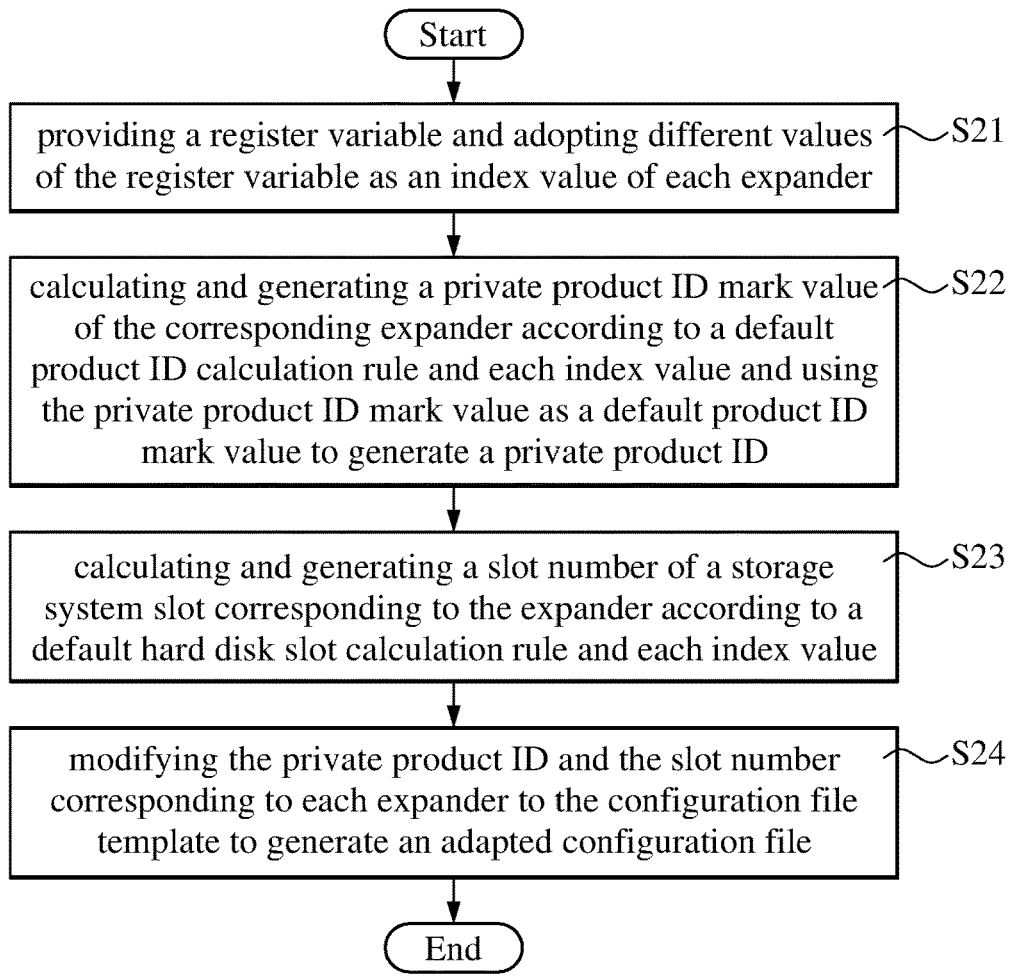
FIG. 4 illustrates a flowchart of the decomposition of one step of the configuring method according to an embodiment of the present invention.

As shown in FIG. 4, in an embodiment of the present invention, step S12: said modifying the configuration file template to the adapted configuration file corresponding to each expander when configuring the plurality of expander configuration files comprises:

Step S21: providing a register variable and adopting different values of the register variable as an index value of each expander;

Step S22: calculating and generating a private product ID mark value of the corresponding expander according to a default product ID calculation rule and each index value and using the private product ID mark value as a default product ID mark character to generate a private product ID;

Step S23: calculating and generating a slot number of a storage system slot corresponding to the expander according to a default hard disk slot calculation rule and each index value;

Step S24: modifying the private product ID and the slot number corresponding to each expander to the configuration file template to generate an adapted configuration file.

It should be noted that the order of step S22 and step S23 is not limited.

In an embodiment of the present invention, said calculating and generating a private product ID mark value of the corresponding expander according to a default product ID calculation rule and each index value comprises: setting a last bit value of a hexadecimal result generated by adding the index value and a hexadecimal number having a last bit value of F as the private product ID mark value.

In an embodiment of the present invention, said calculating and generating a slot number of a storage system slot corresponding to the expander according to a default hard disk slot calculation rule and each index value comprises: calculating an offset according to each index value and generating the hard disk slot number by adding the offset and a default value.

In an embodiment of the present invention, the plurality of expanders are applied in a fiber storage card or a disk array card.

As described above, the configuring device and method of expander configuration file of a storage system of present invention are to store a configuration file template for configuring the expanders; and to modify the configuration file template to the adapted configuration file corresponding to each expander when configuring the plurality of expander configuration files. The technical solution of the present invention can satisfy the requirement of configuring configuration file to each expander by storing configuration file template only, saving the storage space greatly, and can automatically proceed the modification according to an innovative algorithm without under the risk of error updating.

The present invention effectively overcomes various shortcomings in the prior art and has and has a high industrial utilization value.

The embodiments described above merely illustrate the principles and the effects of the present invention, but are not intended to limit the present invention. Any person skilled in the art can modify or change the above embodiments without departing from the spirit and scope of the present invention. Therefore, all equivalent modifications or changes made by persons of ordinary skill in the art without departing from the spirit and technical thought disclosed in the present invention shall still be covered by the claims of the present invention.

The invention claimed is:

1. A configuration method of expander configuration file of a storage system, wherein a plurality of expanders is adapted for being configured by a plurality of corresponding configuration files, with said configuration method comprising:

storing a configuration file template for configuring the expanders; and modifying the configuration file template to the adapted configuration file corresponding to each expander when configuring the plurality of expander configuration files;

wherein modifying the configuration file template to the adapted configuration file corresponding to each expander when configuring the plurality of expander configuration files comprises:

providing a register variable and adopting different values of the register variable as an index value of each expander;

calculating and generating a private product ID mark value of the corresponding expander according to a default product ID calculation rule and each index value and using the private product ID mark value as a default product ID mark character to generate a private product ID;

calculating and generating a slot number of a storage system slot corresponding to the expander according to a default hard disk slot calculation rule and each index value; and modifying the private product ID and the slot number corresponding to each expander to the configuration file template to generate an adapted configuration file.

2. The configuration method of expander configuration file of a storage system according to claim 1, wherein said calculating and generating a private product ID mark value of the corresponding expander according to a default product ID calculation rule and each index value comprises:

setting a last bit value of a hexadecimal result generated by adding the index value and a hexadecimal number having a last bit value of F as the private product ID mark value.

3. The configuration method of expander configuration file of a storage system according to claim 2, wherein said calculating and generating a slot number of a storage system slot corresponding to the expander according to a default hard disk slot calculation rule and each index value comprises:

calculating an offset according to each index value and generating the hard disk slot number by adding the offset and a default value.

4. The configuration method of expander configuration file of a storage system according to claim 1, wherein the plurality of expanders is applied in a fiber storage card or a disk array card.

* * * * *